Dec. 23, 1941.        M. BURGER            2,267,518
          PHOTOGRAPHIC CAMERA AND SHUTTER CONSTRUCTION
                Filed Dec. 16, 1936            3 Sheets-Sheet 1
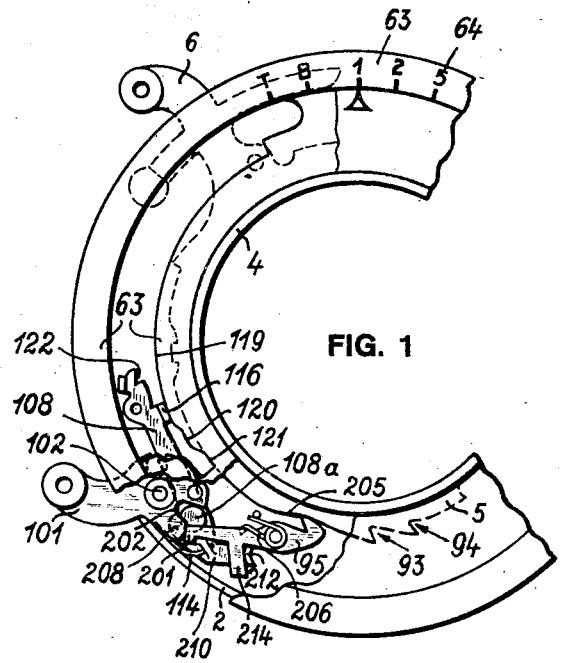
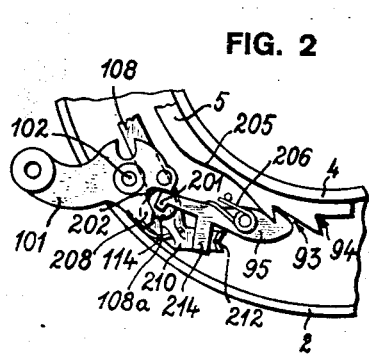
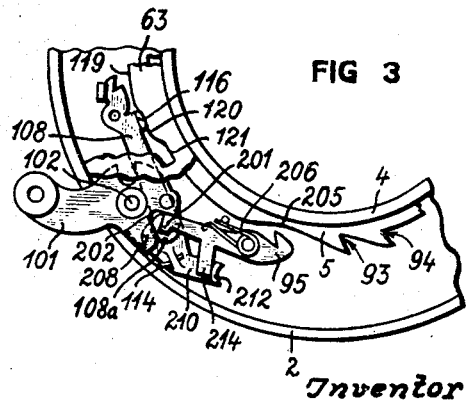
Inventor:
Michael Burger
By Cumpston & Shepard
his attorneys.

Dec. 23, 1941.   M. BURGER   2,267,518
PHOTOGRAPHIC CAMERA AND SHUTTER CONSTRUCTION
Filed Dec. 16, 1936   3 Sheets-Sheet 2
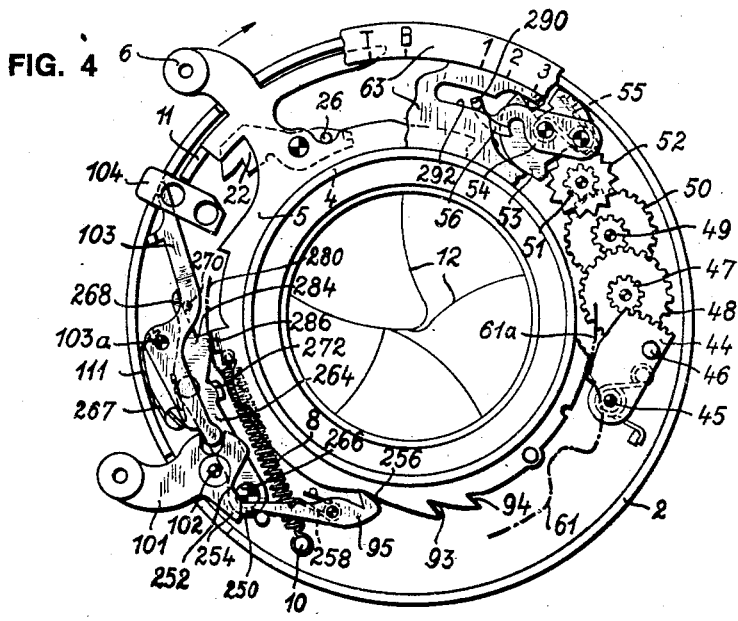
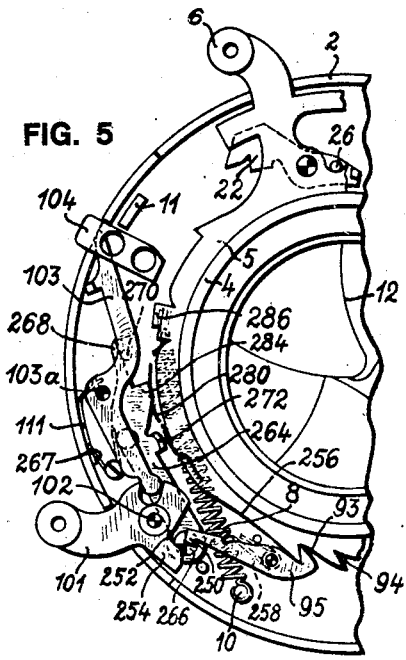
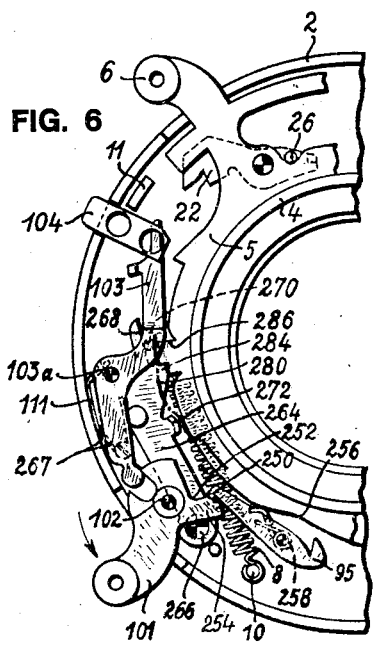
Inventor:
Michael Burger
By Cumpston & Shepard
his attorneys.

Dec. 23, 1941.　　　M. BURGER　　　2,267,518

PHOTOGRAPHIC CAMERA AND SHUTTER CONSTRUCTION

Filed Dec. 16, 1936　　3 Sheets-Sheet 3

Inventor:
Michael Burger
By Cumpston & Shepard
his attorneys.

Patented Dec. 23, 1941

2,267,518

UNITED STATES PATENT OFFICE 2,267,518

PHOTOGRAPHIC CAMERA AND SHUTTER CONSTRUCTION

Michael Burger, Munich, Germany, assignor to Friedrich Deckel, Munich-Prinz-Ludwigshohe, Bavaria, Germany Application December 16, 1936, Serial No. 116,159
In Germany December 21, 1935

12 Claims. (Cl. 95—63)

This invention relates to photographic shutters and cameras, and more particularly to the construction of shutters of the "set" type, and the interconnection of the shutter with certain operating parts of the camera.

An object of the invention is the provision of an improved shutter of the "set" or "tensioned" type, in which the shutter release member is locked against actuation when the shutter has not been properly set or tensioned.

Another object is the provision of such a shutter in which the locking mechanism is arranged within the shutter casing and forms an integral part of the shutter, rather than a supplementary attachment or mechanism outside of the shutter casing.

Still another object is the provision of such a shutter in combination with a photographic camera having means for setting or tensioning the shutter each time that the film is wound or fed.

A further object is the provision in a shutter of the type in which a master operating member is set or tensioned only for instantaneous exposures and not for time or bulb exposures, of mechanism for locking the release member when the shutter is not set or tensioned, and means for rendering this locking mechanism ineffective when the shutter parts are positioned for time or bulb exposures.

A still further object is the provision in shutters of the type in which a master operating member is set or tensioned for every exposure including time and bulb exposures, of locking mechanism which prevents actuation of the shutter release member whenever the master operating member is not properly set or tensioned, even when the shutter parts are positioned for time or bulb exposures, in combination with simple mechanism for making time and bulb exposures by movements of the master operating member.

To these and other ends the invention resides in certain improvements and combinations of parts, all as will be hereinafter more fully described, the novel features being pointed out in the claims at the end of the specification.

In the drawings:

Fig. 1 is a fragmentary front view of a shutter constructed in accordance with one embodiment of the invention, with parts omitted for the sake of clarity, showing the shutter with the master operating member not set or tensioned, and the release member accordingly locked against actuation;

Fig. 2 is a view showing a fragment of the construction shown in Fig. 1, with the master operating member set or tensioned, and the release member unlocked for actuation;

Fig. 3 is a similar view showing the camera parts adjusted for making a bulb exposure and the release member unlocked for actuation even though the master operating member is not set or tensioned;

Fig. 4 is a front view of a shutter constructed in accordance with a different embodiment of the invention, with parts omitted for the sake of clarity, this shutter being one in which the master operating member is set or tensioned for all exposures including time and bulb exposures, the parts being shown with the master member not set and the release member locked against actuation;

Fig. 5 is a similar view to a fragment of Fig. 4 showing the master member set or tensioned and the release member unlocked ready for actuation;

Fig. 6 is a view similar to a fragment of Fig. 4 illustrating the parts in position for a bulb exposure, and with the shutter blades held open;

The same reference numerals throughout the several views indicate the same parts.

Figure 7:
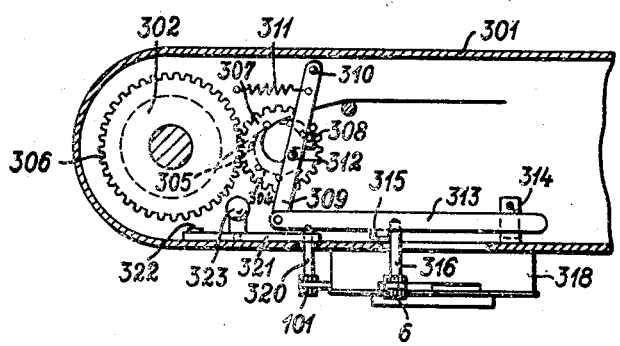
Fig. 7 is a top view with parts broken away and parts in horizontal section of a camera constructed in accordance with one embodiment of the invention, with the shutter of Figs. 4, 5 and 6 applied thereto.

Referring now to the embodiment illustrated in Figs. 1 to 3 of the drawings, the invention is here shown, by way of example, as applied to a shutter constructed in general in the manner disclosed in United States Patent No. 1,687,123, granted October 9, 1928, for an invention of Deckel and Geiger, although the features of the invention may be applied equally well to many other types of shutters. In order to simplify the present disclosure, many of the details of the shutter construction are here omitted, reference being made to said Patent No. 1,687,123 for further information with respect to the general construction of the shutter.

The shutter includes a casing having an outer annular wall 2, an inner annular wall 4, and an annular or ring shaped operating member 5, commonly called the master member, mounted to rotate about the wall or sleeve 4 within the shutter casing. The master member has an extension 6 projecting out through the wall 2 of the casing to an accessible external point. By moving the finger piece 6 in a clockwise direction when viewed as in Fig. 1, the master member is set or tensioned, ready to operate the shutter blades when it is permitted to move back in a reverse or counter clockwise direction, under the influence of the usual motor spring not shown here.

When the shutter is tensioned, it is held in tensioned position by means of a latch 95 engaging in one or another of the two notches 93 and 94 formed in the master ring 5. When the photographer desires to make an exposure, he presses downwardly upon an accessible external end of a release lever 101 pivoted in the casing on the pivot 102, and this release member withdraws the latch 95 from the notch 93 or 94 in which it was engaged, and permits the master member to turn back to its initial position under the influence of the tensioned motor spring, thus opening and closing the shutter blades in known manner. Instead of pressing directly upon the release lever 101, the release lever may be indirectly operated by means of the customary cable release.

A setting disk 63 may be rotated to various positions with respect to the shutter casing, so as to bring different graduations 64 on this disk into alinement with a suitable fixed index mark. This disk 63 has a number of cam surfaces for controlling and regulating various parts of the shutter mechanism. The time exposure lever 108, pivoted on a fixed pivot 108a in the casing, has a spring 114 constantly tending to turn this lever in a clockwise direction about its pivot. The lever also has an ear 116 extending into cooperation with this setting disk 63. When the setting disk 63 is set for any one of the different so-called instantaneous exposures, the ear 116 on the time lever rides upon a surface 119 of the disk 63, which surface is concentric with the axis of rotation of the disk. When the control disk is turned to set it for a bulb exposure, however, then a shallow depression 120 is brought opposite the ear 116 and the spring 114 may now turn the lever 108 slightly in a clockwise direction about its pivot 108a, so that the ear 116 rests in the slight depression 120. If the control disk 63 be set to the position for a time exposure, then a somewhat deeper recess or notch 121 on the disk 63 is brought opposite the ear 116, and the time lever 108 may swing still further in a clockwise direction under the influence of its spring 114.

The parts thus far described have, for convenience of description, been given the same reference numerals used for the corresponding parts in said Deckel and Geiger Patent No. 1,687,123, and these parts may all be constructed in the same way and function or operate in the same manner as disclosed in said patent, except for the differences now to be described.

According to the present invention, the latching lever 95 is connected to the release member 101 in a somewhat different way than the connection illustrated in said patent. The latching member has a tail 201 lying in a notch 202 in the release member 101, when the latch 95 is engaged with either one of the notches 93 and 94, as shown in Fig. 2, the master member 5 then being in set or tensioned condition. But when the master member 5 is in its rest position, at the end of one exposure and before it has been retensioned for the next exposure, a recess or depression 205 on the master member 5 is opposite the latch 95, and a spring 206 connected to the latch 95 and constantly tending to move it in a counter clockwise direction is thus permitted to swing the right hand end of the latch (when viewed as in Fig. 1) into this recess 205. This causes the left hand end or tail 201 of the latch to lie, not in the notch 202 of the member 101, but in alinement with the end 208 of a short arm formed on the member 101 and constituting one side of the notch 202. This position is illustrated in Fig. 1. The tail 114 now blocks the member 101 so that the member 101 can not move to any substantial extent in a releasing or counter clockwise direction. The attempt to move the member 101 in a releasing direction simply presses the end of the arm 208 against the tail 201 of the latch lever 95, without moving the latch lever. The end of the arm 208 is preferably flattened as shown, to provide a good seat giving a firm bearing against the flat end of the tail 201.

This provides an interlock between the master member 5 and the release member 101, preventing actuation of the release member unless the master member has been set or tensioned. Such an interlock is highly desirable in obviating the disappointment sometimes experienced by photographers, especially by beginners who press the release lever to make an exposure without having previously tensioned the master member, and who sometimes do not realize that an exposure has not been made. If such a person, however, finds that he can not depress the release lever or operate the cable release, and that motion thereof is blocked, he is thus immediately notified that something is wrong and he can immediately set or tension the master member and then make the desired exposure.

With the particular type of shutter shown in said Deckel and Geiger patent, the master member is not intended to be set or tensioned when time or bulb exposures are made. Only the release member 101 (or the cable release) is moved in making such exposures. The interlocking mechanism provided according to this invention would prevent the making of time or bulb exposures with a shutter of this type, unless some means were provided for disabling this interlock when time or bulb exposures were required. Accordingly, the present invention further includes such disabling mechanism.

In the present instance, the disabling mechanism is provided by an extension 210 on the time lever 108. This extension 210 is provided with an upstanding ear 212 which lies behind one edge of an arm 214 on the latching lever 95. When the time control disk 63 is set for any one of the instantaneous exposures, the cam surface or control surface 119 on the disk, acting upon the ear 116 on the time lever, holds this time lever in such position that the ear 212 does not interfere in any way with the movements of the latching member 95. When, however, the control disk 63 is set for either time or bulb exposures, then the time lever 108 is turned somewhat in a clockwise direction from the position shown in Fig. 1, and the ear 212 on the time lever contacts with the arm 214 on the latching lever and moves the latching lever to the position shown in Fig. 3, in which the tail 201 is no longer opposite the arm 208, but is in the notch 202 where it does not prevent movement of the release lever 101. In Fig. 3, the time lever 108 is shown in the position which it assumes when the control disk 63 is set for a bulb exposure. When the control disk is set for a time exposure, the time lever swings a little further in a clockwise direction, the ear 116 entering the notch or recess 121, but the effect upon the latching lever 95 is substantially the same in either case.

It is now seen that the mechanism described with reference to Figs 1, 2 and 3 embodies an interlock which prevents actuation of the release member 101 whenever the shutter is set for an instantaneous exposure, unless the master member has been properly tensioned. At the same time, this interlock does not prevent actuation of the release member when the shutter is set for time or bulb exposures, even though the master member is not set or tensioned. It is to be noted especially that this interlocking mechanism is all built into the shutter as an integral part thereof, enclosed with the usual shutter casing, and it is not a mere attachment or external appliance, and does not have any parts projecting out of the casing to positions where they may become injured by careless handling or create an unsightly appearance.

A shutter constructed according to the embodiments of the invention above described, in connection with Figs. 1 to 3, is well adapted for use on cameras having mechanism for automatically tensioning the shutter each time the film feeding means is operated to wind a fresh area of film into position to be exposed, provided that such automatic tensioning mechanism is so arranged that it may be disconnected or rendered ineffective when time or bulb exposures are to be made. Such automatic tensioning mechanism is disclosed in United States Patent No. 2,028,752, granted January 28, 1936, for an invention of the present applicant, Michael Burger. When the automatic tensioning mechanism of said Burger patent is employed in combination with the above described embodiment of shutter according to this present invention, excellent results are obtained.

Sometimes, however, it is desirable to employ a shutter in which the master member may be tensioned not only for instantaneous exposures, but also for bulb and time exposures. When this is the case, the present invention may nevertheless be employed, in a slightly different embodiment which will now be described with particular reference to Figs. 4, 5 and 6 of the drawings.

This second embodiment also is illustrated by way of example as applied to a shutter constructed in general in the manner disclosed in said Deckel and Geiger Patent No. 1,687,123, and the same reference numerals employed for the various parts in said patent are used also for the corresponding parts in Figs. 4 to 6 of the present application. Reference is made to said patent for a more complete description of the construction and operation of the shutter, and especially of those parts thereof not illustrated in the present drawings.

The shutter may comprise a casing having an outer wall 2 and an inner annular wall or lens tube 4, and a plurality of shutter blades 12. The ring shaped master operating member 5 rotates about the part 4. A motor spring 8 has one end connected to the master member and the other connected to a fixed post 10 in the casing, so that the motor spring constantly tends to turn the master member in a counterclockwise direction when viewed as in Figs. 4 to 6. The normal rest position of the member is determined by a stop 11 fixed to the casing. By pressing the externally accessible finger piece 6 in the direction of the arrow, the master member 5 may be set or tensioned until the latch 95 engages with one or another of the two notches 93 and 94 in the master member. When the latch 95 is released, the master member 5 turns back from its set or tensioned position to its rest position, and during this turning movement it opens and closes the shutter blades 12. This opening and closing movement is accomplished by an operating lever 22 mounted on the master member, which co-acts with a bell crank lever not shown in the present drawings but illustrated at 19 in Figs. 11 and 12 of said Deckel and Geiger patent.

During the reverse or counterclockwise movement of the master member 5 a resistance or timing mechanism may come into play in order to time the exposure to the required duration. This timing mechanism includes a gear sector 44 meshing with a pinion 47 secured to a gear 48 which meshes with a pinion 49 secured to the gear 50. The gear 50 meshes with a pinion 51 on an anchor wheel 52 which cooperates with a vibrating anchor or escapement 53 pivoted to a lever 54 which is influenced by a spring 55 constantly tending to hold the anchor 53 in engagement with the wheel 52. A shoe shaped end 56 of the lever 54 bears against the circumference of the ring 5, which is shaped like a cam with depressed portions and raised portions, to cause a greater or lesser engagement of the vibrating anchor 53 in the anchor wheel 52 at different positions of the master member.

The duration of the exposure and also the character of the exposure (whether instantaneous or bulb or time) are determined by means of a controlling or setting disk 63 rotatable around the tube 4 and having various controlling cam surfaces thereon, including a cam surface 61 for operating upon a pin 46 on the toothed sector 44 to determine the extent to which this sector may extend across the path of travel of the master member 5 and impede or slow up the movement thereof.

After the master member 5 has been moved in a clockwise direction to its set or tensioned position and has been latched therein by means of the latch 95, it may be released to make an exposure by pressing downwardly on the accessible end of the release lever 101 pivoted in the casing at 102. Turning this lever in a counterclockwise direction by depressing its outer accessible end, releases the latch 95 from the notch 93 or 94 in which it is engaged. In order to permit operation of the shutter by a cable release, an intermediate lever 103 is pivoted in the casing about a pivot 103a and extends from the release lever 101 to the cable release fixture 104. A spring 111 acts upon the intermediate lever 103 to tend to turn it in a counterclockwise direction, thus tending to turn the release lever 101 in a clockwise direction and holding the outer end thereof at the upper limit of its motion.

The parts thus far described in connection with Figs. 4, 5 and 6 may all be substantially identical with the correspondingly numbered parts of the shutter disclosed in said Deckel and Gieger patent, except for the differences now to be described.

Instead of connecting the latch lever 95 to the release lever 101 in the manner illustrated in the Deckel and Geiger patent, the same type of connection is used as that disclosed in the first embodiment above described in connection with Figs. 1, 2 and 3. The latch lever 95 is provided with a tail 250 which, when the latch lever is engaged with one or the other of the latching notches 93 and 94, lies in the position shown in Fig. 5, in a notch or recess 252 of the release lever 101, where it may be moved laterally by the arm 254 of the release lever when the release lever is swung downwardly. When the master member 5 is in its untensioned position of rest, however, as shown in Fig. 4, then a depression or notch 256 on the master member is opposite the end of the latching lever 95, and the spring 258 acting upon the latching lever is permitted to swing this lever until its tail 250 lies substantially against the flattened end of the arm 254 of the release lever 101, and blocks movement of the release lever. Therefore, just as in the first embodiment previously described, the release lever 101 can not be actuated unless the master member has been moved away from its rest position to its set or tensioned position.

In this present embodiment no means is provided for disabling the locking of the release lever by the latch lever when a time exposure or a bulb exposure is to be made, because the shutter of this present embodiment is intended to be tensioned for time and bulb exposures as well as for instantaneous exposures, and in this respect differs from the shutter of the Deckel and Geiger patent as well as from the first embodiment above described.

In the Deckel and Geiger patent, the pin 26 carried by the operating lever 22 mounted on the master member 5, extends upwardly from this lever into the plane of the setting disk 63 and is acted upon by one of the cam surfaces of the setting disk. According to the present invention, this pin 26 is made shorter, so that it does not cooperate with the setting disk 63, but serves only as a stop pin to contact with the master member 5 as shown in the present drawings, to limit the extent of movement of the operating lever 22 in a clockwise direction about its pivot. Thus, when the setting disk 63 is set for time or bulb exposures, this does not swing the lever 22 to a position which locks the master member against setting or tensioning movement, and the master member can still be set or tensioned. Then, when the master member is released for its operating or counterclockwise movement, it opens and closes the shutter blades just as it does during an instantaneous exposure, except that the motion of the master member is interrupted at a point where the shutter blades are open, in order to maintain the shutter blades open until the release lever is allowed to return to its initial position (in the case of a bulb exposure) or until the release lever is operated a second time (in the case of a time exposure).

The time and bulb members 105 and 106 of the Deckel and Geiger patent are omitted in this present embodiment. Instead, there is provided a bulb exposure lever 264 pivoted on a fixed pivot 266 in the casing. A spring 267 acts on the bulb lever 264 and tends constantly to swing this lever in a clockwise direction about its pivot 266. Such clockwise movement is limited, however, by an end 268 on the lever 264, which lies to the left of a pin 270 on the intermediate lever 103.

The bulb lever 264 also has an upstanding ear 272 which extends into the plane of the setting disk 63 and cooperates with a cam surface on the setting disk, as shown in dot dash lines at 280. This cam surface 280 corresponds in general to the cam surface 119 on the setting disk 63, disclosed in said Deckel and Geiger patent and has relieved or depressed portions corresponding in general to those shown at 120 and 121 of the Deckel and Geiger patent. The bulb lever 264 also has a shoulder 284 in position to contact, under certain circumstances, with an ear or lug 286 on the master ring 5.

When the setting disk 63 is set for any one of the various lengths of instantaneous exposures, a cam surface 280, contacting with the ear 272, holds the bulb lever 264 in such position that the shoulder 284 is out of the path of travel of the ear 286 on the master member, when the master member moves. But when the setting disk 63 is set for either time or bulb exposures, a depressed or relieved portion of the cam surface 280 comes opposite the ear 272 and, so far as the setting disk 63 is concerned, the lever 264 may now swing further in a clockwise direction about its pivot 266, until the shoulder 284 lies in a path of the ear or lug 286. When the setting disk 63 is set for a bulb exposure, the master member is then set or tensioned just as in the case of an instantaneous exposure. If the release lever 101 is now operated, either by direct contact with the lever or by the cable release, the intermediate lever 103 will be swung in a clockwise direction about its pivot 103a. The pin 270 on the lever 103 will thus move to the right, allowing the bulb lever 264 to move to the right until the ear 272 thereon comes into contact with the cam surface 280. The shoulder 284 will now lie in the path of movement of the lug 286 on the master member and as the master member moves in its shutter operating movement, the lug 286 will strike against the shoulder 284 and movement of the master member will be stopped at an intermediate point of such movement, while the shutter blades are still open. This position is indicated in Fig. 6.

If the release lever 101 is now permitted to return upwardly to its initial position, the pin 270 on the intermediate lever 103 will act upon the end 268 of the bulb lever 264 to pull the bulb lever outwardly away from the master member, permitting the lug 286 on the master member to slip off of the shoulder 284. The master member then completes its movement to its rest position, closing the shutter blades.

If the shutter is intended for time exposures as well as bulb exposures, then a time lever is provided, extending approximately parallel to the bulb lever 264, and moved in a direction opposite to the bulb lever, the time lever having a shoulder which comes under the lug 286 of the master member when the shoulder 284 of the bulb lever is withdrawn therefrom, and a second actuation of the release lever 101 withdraws the shoulder of the time lever from the lug on the master member and permits the master member to continue its movement to its rest position, closing the blades. Such a time lever is well known in the art and has been omitted from Figs. 4 to 6 of the drawings of this application for the sake of clarity.

When the master member is stopped in its intermediate position by means of the bulb lever or the time lever, the shape of the surface of the master member which is then opposite the latching lever 95 is such that it does not permit the latching member to swing quite far enough in a counterclockwise direction to lock the release lever 101 against actuation. Thus, in case a time exposure is being made the release lever may be returned to its initial position and then depressed a second time in order to complete the time exposure. When the master member finally reaches its rest position, however, then the end of the latching lever 95 is permitted to enter the recess 256 of the master member to a sufficient extent so that the tail 250 of the latching member locks the release lever 101 as shown in Fig. 4, and the release lever can not now be actuated until the master member is set or tensioned.

In order to prevent the master ring from hitting against the shoulder 284 of the bulb lever 264 with such force as to damage the parts, it is desirable that the retarding mechanism come into play during the making of time and bulb exposures. Hence the cam surface 61 of the setting disk 63, which controls the extent, if any, to which the sector 44 lies across the path of travel of the master member, is developed (at 61a) in such a way that when the setting disk is set for time or bulb exposures, the sector 44 extends across the path of the master member in position to come in contact with and be moved by the master member during its travel. Also, one end of the shoe 56 of the lever 54 is formed into an upwardly extending projection or pin 290 extending into the plane of the setting disk 63 and cooperating with a cam surface 292 thereof. When the setting disk is set for either time or bulb exposures, the cam surface 292 shifts the lever 54 to such position that the vibrating anchor 53 is out of contact with the anchor wheel or escapement wheel 52. Thus the additional resistance of the vibrating anchor is eliminated, but the blow of the master member against the abutment 284 is cushioned or softened by the train of gearing 44 to 52, inclusive, which must be driven by the master member and which thus acts as a brake to slow down the movement of the master member somewhat before the lug 286 reaches the shoulder 284. While the gear train 44 to 52 acts as a sufficient brake for this purpose, it does not slow up the master member to an undesirable extent, or prevent the making of relatively rapid bulb exposures, as might be the case if the vibrating anchor 53 remained engaged with the anchor wheel 52 during time and bulb exposures.

Since the shutter of Figs. 4, 5, and 6 is to be tensioned for all exposures, including time and bulb exposures, it may be used with an automatic tensioning arrangement for tensioning the shutter each time that the film is wound, and this tensioning arrangement need not have any provision for disabling it when time or bulb exposures are to be made, as was the case with the automatic tensioning arrangement of said Burger Patent No. 2,028,752. According to the present invention, the automatic tensioning mechanism may be substantially as disclosed in Figs. 7 and 8 of the present drawings.

The camera may comprise a casing indicated in general at 301, having a film pick-up spool 302 which can be turned by a knob 303. A film feeding roller 304 is arranged along side the spool 302 and is provided with teeth 305 which engage perforations in the film to feed the film accurately. The film spool 302 is connected to a gear 306 which drives a gear 307 on the feeding roller 304, thus driving the feeding roller whenever the spool 302 is turned by the knob 303. A locking device, of a well known kind, not here shown in detail, is provided so that the feeding roller 304 may be turned only one revolution at a time, and stops at exactly the end of one complete revolution, this amount of rotation corresponding to the distance by which the film should be advanced between each two successive exposures.

A cam 308 is fixed to the feeding roller 304 to rotate therewith. As it rotates, this cam acts upon and moves a pin 312 on a lever 309 pivoted in the casing at 310 and influenced by a spring 311 which constantly tends to hold the pin 312 against the surface of the cam 308. The end of the lever 309 remote from the pivot 310 is pivotally connected to a rod 313 slidable longitudinally within the camera casing through a fixed guide 314. This rod 313 carries a downwardly extending finger 315 lying just to the left (when viewed as in Figs. 7 and 8) of a pin 316 secured rigidly in the tensioning arm 6 of the shutter and extending rearwardly from the tensioning arm. The shutter in general is here indicated for convenience at 318, but it will be understood that this is preferably above described in connection with Figs. 4, 5, and 6 of the drawings.

The release lever 101 of the shutter has a similar rearwardly extending pin 320 fixed to it and passing through a slot in a lever 321 pivoted to the casing at 322 and connected intermediate its ends to a vehicle plunger 323 which extends upwardly to an accessible upper end projecting above the top of the camera casing.

Figure 8:
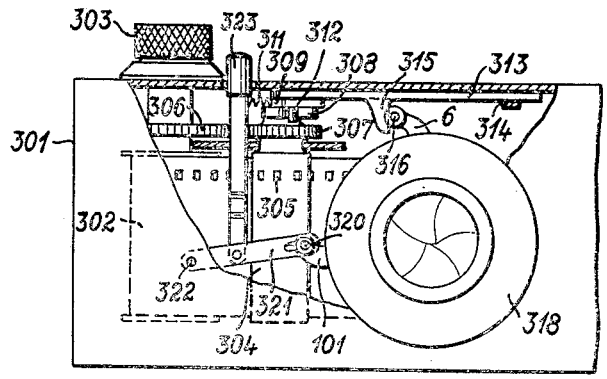
Fig. 8 is a front view, with parts broken away, of the camera illustrated in Fig. 7, showing the shutter of Figs. 4, 5 and 6 applied thereto.

Each time that the knob 303 is turned to feed a fresh area of film into the focal plane or exposure area of the camera, this turns the cam 308, thereby acting against the pin 312, moving the lever 309 and the arm 313, and moving the pin 316 to the right when viewed as in Figs. 7 and 8, thus setting or tensioning the master member of the shutter. Just at the end of the feeding operation, the pin 312 drops off of the high part of the cam 308 to the low part thereof and the spring 311 pulls the lever 312 and arm 313 back in a leftward direction to their initial positions, so that the projection 315 is out of the way of the pin 316 and will not interfere with the return or shutter-operating movement of the master member.

When the photographer is ready to make an exposure, he depresses the plunger 323, which moves the lever 321 downwardly, thus depressing the release lever 101 of the shutter and making it unnecessary for the photographer to reach around to the front of the camera to operate the release lever directly.

This mechanism for tensioning and releasing the shutter needs no special provision for bulb or time exposures, and will operate entirely satisfactory when making such exposures as well as when making instantaneous exposures, because the shutter, as already explained in connection with Figs. 4, 5, and 6, is intended to be tensioned for bulb and time exposures just the same as for instantaneous exposures.

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. A photographic shutter of the type including a casing, a master member within the casing for operating the shutter, means accessible from the exterior of the casing for moving said master member from a rest position to a tensioned position ready to operate said shutter to make an exposure, means within the casing for latching said master member in tensioned position, and release means accessible from the exterior of the casing for unlatching said latching means to release said master member for exposure-making movement from said tension-position back to said rest posititon, the combination with said master member and said release means, of locking means within said casing for locking said release means against movement in releasing direction when said master member is in said rest position.

2. A photographic shutter of the type including a casing, a master member within the casing for operating the shutter, means accessible from the exterior of the casing for moving said master member from a rest position to a tensioned position ready to operate said shutter to make an exposure, means within the casing for latching said master member in tensioned position, and release means accessible from the exterior of the casing for unlatching said latching means to release said master member for exposure-making movement from said tensioned position back to said rest position, the combination with said master member, release means, and latching means, of resilient means tending to press a portion of said latching means against said master member, the part of said master member against which said latching means is pressed being so shaped that said latching means is held in a different position when said master member is in its rest position than when said master member is in its tensioned position, and means dependent upon the position of said latching means for locking said release means against actuation when said master member is in its rest position.

3. A photographic shutter of the type including a casing, a master member within the casing for operating the shutter, means accessible from the exterior of the casing for moving said master member from a rest position to a tensioned position ready to operate said shutter to make an exposure, means within the casing for latching said master member in tensioned position, and release means accessible from the exterior of the casing for unlatching said latching means to release said master member for exposure-making movement from said tensioned position back to said rest position, the combination with said master member, release means, and latching means, of resilient means tending to press a portion of said latching means against said master member, the part of said master member against which said latching means is pressed being so shaped that said latching means is held in a different position when said master member is in its rest position than when said master member is in its tensioned position, and a portion on said latching means for locking said release means against actuation when said master member is in its rest position.

4. A photographic shutter including a master member movable from a rest position to a tensioned position to condition the shutter for making an exposure, a latching lever for engaging said master member to latch it in said tensioned position, and a release lever for moving said latching lever to unlatching position to release the tensioned master member for movement back to its rest position, said latching lever having a different position when said master member is in rest position than when said master member is in tensioned position, and said latching lever having a portion blocking substantial movement of said release lever when said latching lever is in the position corresponding to said rest position of said master member.

5. A shutter according to claim 1, further comprising setting means for setting the shutter to make a plurality of different classes of exposures, and means controlled by said setting means for rendering said locking means ineffective when said setting means is set for part of said different classes of exposures.

6. A shutter according to claim 2, further including setting means for setting the shutter to make instantaneous exposures, for which said master member should be set to tensioned position, and to make non-instantaneous exposures, for which said master member should not be set to tensioned position, and means controlled by said setting means for holding said latching means in non-locking position with respect to said release means, when said setting means is set to make a non-instantaneous exposure.

7. A photographic shutter including a master member movable from a rest position to a tensioned position to condition the shutter for making an instantaneous exposure, a latching lever for engaging said master member to latch it in said tensioned position, setting means for setting said shutter to make instantaneous exposures and non-instantaneous exposures, a release lever for operating said shutter when said setting means is set to make non-instantaneous exposures and for moving said latching lever to unlatching position to release the tensioned master member for movement back to its rest position when said setting means is set to make instantaneous exposures, said latching lever tending to assume a different position when said master member is in rest position than when said master member is in tensioned position, said latching lever having a portion blocking substantial movement of said release lever when said latching lever is in said different position which it tends to assume, and means controlled by said setting means for holding said latching lever in non-blocking relationship to said release lever when said setting means is set for a non-instantaneous exposure.

8. In a shutter for photographic cameras, the combination with a shuter casing, of mechanism therefor including a power spring, a movable setting lever extending through the casing and mounted to move through a fixed path for placing the spring under tension when moved to one end of its path, a shutter trigger extending through the shuter casing, a movable mount for the shutter trigger upon which it may move in a fixed path to and from a position in which it may operate the shutter mechanism, a movable latching member adapted to cooperate with the shutter setting member at one end of its path of movement for holding the trigger in an inoperative position at one end of its path of movement, said setting member being adapted to release said trigger when said setting member is moved through its fixed path to place the power spring under tension whereby the shutter trigger may be operated to actuate the shutter mechanism.

9. In a shutter for photographic cameras, the combination with a shutter casing, of shutter mechanism mounted therein including a power spring, a shutter setting member movably mounted in the shutter casing and extending therethrough, a mount for the shutter setting member on which it may move through a fixed path to place the shutter spring under tension, a shutter trigger movably mounted in the shutter casing and extending therethrough, a mount for the trigger on which it may move through a fixed path, means contained in the shutter casing for holding the trigger against movement at one end of its path, said means comprising a movably mounted latch element inside of the shutter casing adapted to engage the shutter setting member at one end of its path of movement, the path of movement of the shutter setting member being such that said latching element may be released by moving the shutter setting member toward one end of its path to tension the shutter spring, whereby said trigger may be actuated only when said shutter spring is under tension.

10. In a shutter for photographic cameras, the combination with a shutter casing, of shutter mechanism therein including a power spring, a movable setting member for placing the spring under tension, a trigger adapted to be manually actuated for releasing the shutter mechanism and means for latching the trigger against movement, and cooperating parts on said means and shutter setting member adapted to release the latching means when the shutter setting member is moved to one position.

11. In a shutter for photographic cameras, the combination with a shutter casing, of shutter mechanism mounted therein including a power spring, a shutter setting member movably mounted in the shutter casing and extending therethrough, a mount for the shutter setting member on which it may move through a fixed path to place the shutter spring under tension, a shutter trigger movably mounted in the shutter casing and extending therethrough, a mount for the trigger on which it may move through a fixed path, means contained in the shutter casing for holding the trigger against movement at one end of its path, said means comprising a movably mounted holding element inside of the shutter casing adapted to engage the shutter setting member at one end of its path of movement, the path of movement of the shutter setting member being such that said holding element may be released by moving the shutter setting member toward one end of its path to tension the shutter spring, whereby said trigger may be actuated only when said shutter spring is under tension.

12. In a shutter for photographic cameras, the combination with a shutter casing, of shutter mechanism therein including a power spring, a movable setting member for placing the spring under tension, a trigger adapted to be manually actuated for releasing the shutter mechanism and means for holding the trigger against movement, and cooperating parts on said means and shutter setting member adapted to release the holding means when the shutter setting member is moved to one position.

MICHAEL BURGER.